Oct. 14, 1969  R. FERWERDA  3,471,950
COMBINED DIGGING BUCKET AND SAW
Filed March 22, 1967                                    2 Sheets-Sheet 2
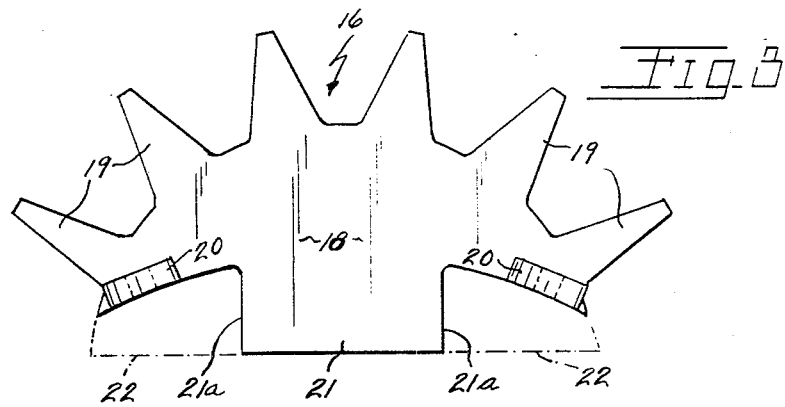
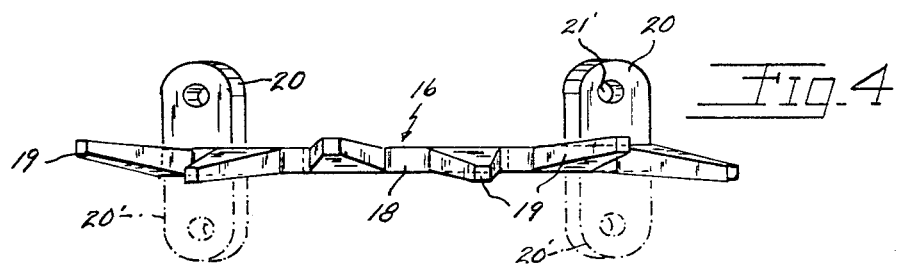
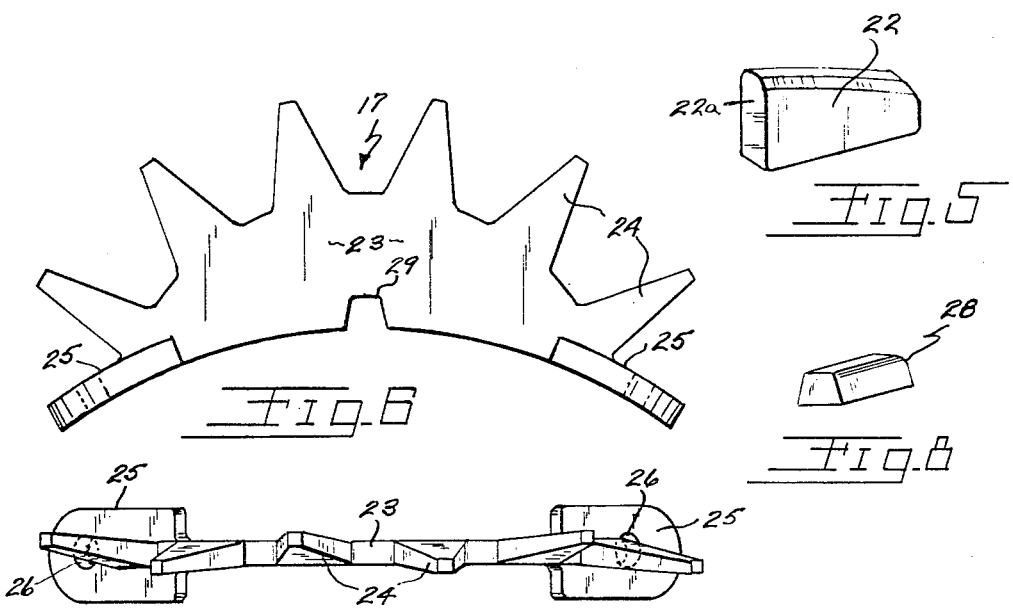
INVENTOR.
RAY FERWERDA
BY
Baldwin, Doran & Egan
ATTORNEYS United States Patent Office 3,471,950
Patented Oct. 14, 1969

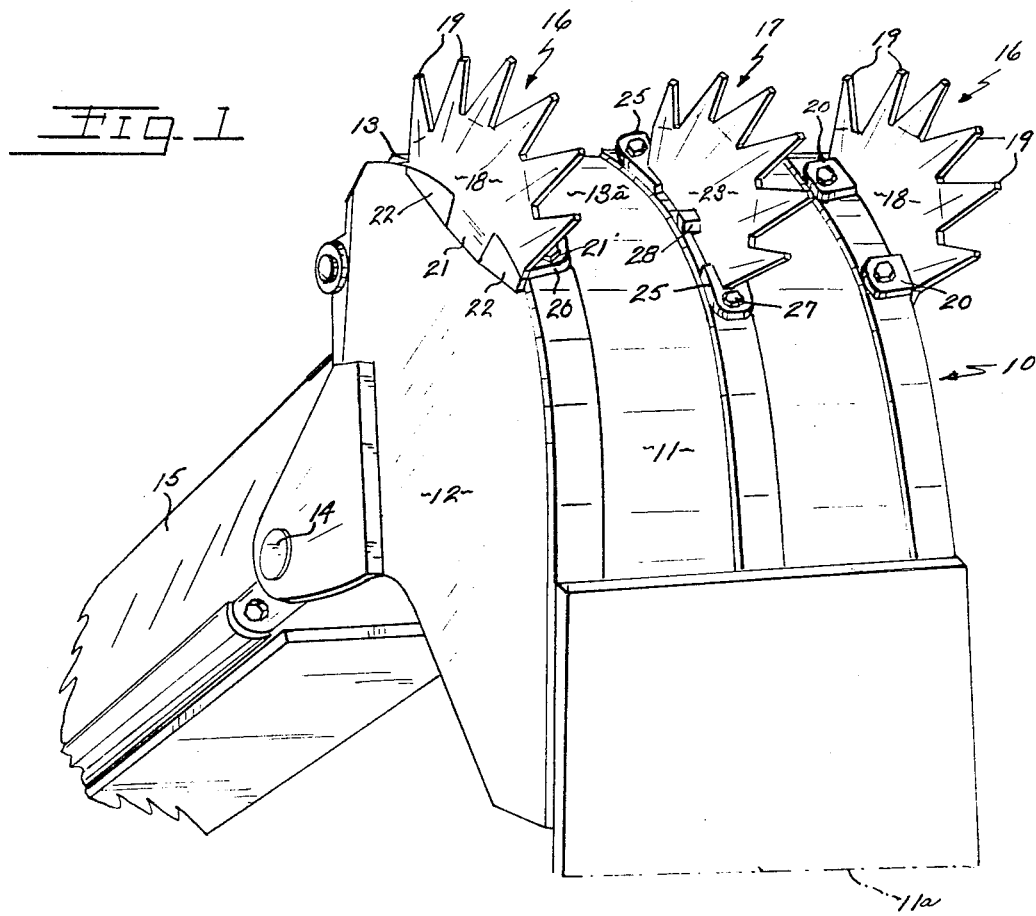

3,471,950
COMBINED DIGGING BUCKET AND SAW
Ray Ferwerda, 1050 NW. 163rd Drive,
North Miami, Fla. 33169
Filed Mar. 22, 1967, Ser. No. 625,139
Int. Cl. E02f 3/14, 3/64
U.S. Cl. 37—118    2 Claims

ABSTRACT OF THE DISCLOSURE

In a digging bucket having a bottom terminating in a leading digging edge, at least one row of saw teeth is provided extending generally at right angles to the digging edge, rigidly secured to the bucket, and protruding outwardly from the bucket bottom sufficiently to cut into excavatable material below the bucket bottom during excavating travel of the bucket. Preferably, when digging a trench, parallel rows of saw teeth are provided on opposite side edges of the bucket to define the side walls of the trench as the excavation proceeds downwardly.

---

In excavating coral rock, shale, hard clay, and other such difficult materials, a digging bucket will make faster progress if the excavatable material is preliminary scored so as to break the material up into chunks when attacked by the leading edge of the digging bucket. The present invention provides saw means on the bottom of the bucket so that while dragging the bottom of the bucket along the excavating material in order to fill the bucket, a scoring of the material beneath the bucket bottom is provided preparing the material next to be excavated for easier digging.

Other objects and advantages of this invention will be apparent from the accompanying drawing and description and the essential features will be set forth in the appended claims.

In the drawing,

FIG. 1 is a perspective view showing this invention applied to the bottom of a digging bucket which in turn is attached to a boom of an excavating machine;

FIG. 2 is a side elevational view of a trencher machine showing this invention applied to the row of digging buckets mounted on an endless chain;

FIG. 3 is a side elevational view of one of the rows of saw teeth generally in alignment of a side wall of a digging bucket of FIG. 1;

FIG. 4 is a top plan view of the row of saw teeth shown in FIG. 3 indicating the positioning of fastening ears in either of two lateral directions;

FIG. 5 is a perspective view of a key means utilized in connection with securing the teeth of FIGS. 3 and 4 to a digging bucket;

FIG. 6 is a side elevational view of the row of saw teeth shown in the center of the bottom of the digging bucket of FIG. 1;

FIG. 7 is a top plan view of the same; while

FIG. 8 is a key adapted to be secured to the bottom of the bucket and snugly entering a recess shown in the base of the saw teeth clearly in FIG. 6.

Referring now to FIG. 1, a digging bucket 10 has a generally flat bottom 11, parallel side walls 12, and at least a partial back 13. There are various ways that the bucket 10 might be manipulated during a digging action but this particular bucket is shown pivotally mounted at 14 on a boom 15 of an excavating machine. During an excavating operation, the bucket is manipulated in a well known manner to present its digging edge 11a to excavatable material so as to fill the bucket 10 with loose material. It should be understood that the digging edge 11a might take any number of forms, such as various arrangements of digging teeth, etc., and it is, therefore, indicated with a dot-dash line.

In order to render the material more easily dug when it is hard rock, shale, clay, etc., at least one row of saw teeth is rigidly secured along the bottom of the bucket including at least one row of saw teeth extending generally at right angles to the digging edge 11a and extending outwardly from the bottom of the bucket sufficiently to cut into the material below the bucket bottom as the bucket slides along the excavatable material during a filling operation. Preferably, a plurality of these rows of saw teeth are provided as shown in FIG. 1 wherein two generally parallel rows 16 are provided generally in line with the sides 12 of the bucket and at least one intermediate row 17 midway between the two sets 16. It should be understood that in digging a trench with this bucket, the teeth 16 will delineate the side walls of a trench and cut parallel grooves extending the side walls downwardly during a bucket filling operation while the intermediate row 17 will make another groove so that the material will fall apart more easily during the next pass of the digging bucket along the trench.

Referring now to FIGS. 3 and 4, each row of saw teeth 16 comprises a generally planar base metal plate 18, from the top of which radially extend outwardly a plurality of teeth 19. In one embodiment, the plate 18 is ¾ inch thick steel plate and the teeth 19 are integral therewith and of approximately the same thickness with the teeth generally triangular in shape converging away from the base 18 and with the center lines of the teeth spaced about 4½ to 4¾ on center. In this embodiment, the teeth were about three inches in length and were alternately given a set in opposite directions along the row of teeth as clearly seen in FIG. 4. The set in this particular embodiment caused the tip of each tooth to lie about ¼ inch outside the plane of the base plate 18.

Detachable fastening means is provided for securing each of the rows 16 to the bucket structure. The form here shown comprises two laterally extending ears 20 at the bottom of the base 18 and having bolt holes through which bolts 21' may pass to secure the row of teeth to the bucket. Two different arrangements of the rows 16 might be provided, one having the ears 20 extending toward the right as shown in FIG. 1 and the other having them extending toward the left as shown at the right-hand side of FIG. 1. Preferably however, one set of teeth is made symmetrical about a center line so that the left-hand set 16 in FIG. 1 may be turned side for side and end for end to be secured at the right-hand side if it is desired to switch these sets of teeth. In any case, this would call for the manufacture of one set only to be used turned either direction. Alternatively, a set of ears indicated in dot-dash line in FIG. 4 at 20' could be provided extending in the opposite direction instead of those shown and already described in full lines.

It will be understood that as the bucket is pulled along hard excavatable material, a strong thrust occurs endwise of each set of teeth and disengageable, interengaging key means is provided independent of the fastening means so as to take much of this thrust load. In the teeth sets just described, the key means includes a tongue 21 extending downwardly from the base 18 and having square shoulders 21a front and rear. Rigidly fixed on the bucket, as by welding, are two blocks 22, shown separately in FIG. 5. These blocks are welded to the side wall 12 of the bucket in position to snugly abut at 22a against the shoulders 21a of the projection 21. It is obvious from this construction that a row of teeth 16 may be detached from the bucket and replaced by another set without disturbing the blocks 22.

The row of teeth 17 is clearly shown, enlarged, in FIG. 6. The structure here is similar to that already described comprising a planar base plate 23 having upstanding teeth 24 similar to those already described. The fastening means here comprises ears 25 symmetrically placed on the center line of base plate 23 and having holes 26 through which bolts 27 may pass to secure the teeth to the bucket.

In this intermediate set of teeth 17, the key means is a piece of metal as clearly shown in FIGS. 1 and 8 at 28, the same being about one inch by ⅞ inch in section and approximately two inches long. The side walls might be square and parallel although a preferred form is shown in the drawings slightly diverging downwardly. This key is welded to the bucket bottom and fits snugly in a recess 29 in the base plate 23 when the teeth are in place on the bottom of the bucket. If this set 17 is made symmetrical about a center line, it can be turned end for end if the teeth at the front end become worn quickly.

This invention is not limited to the type of bucket shown in FIG. 1 because it might be applied to a dragline bucket or to a trenching machine as shown in FIG. 2 where a plurality of buckets 30 are secured to an endless chain or belt 31 which is driven in the well known manner to cause the buckets to move in the direction of the arrow of FIG. 2 while digging a trench. This invention is roughly indicated at 32 as one or more rows of teeth protruding outwardly from each digging bucket bottom to perform the same function already described in connection with FIG. 1.

It will be noted in FIG. 1 that the bucket has a convex outwardly curved portion 13a joining the back 13 and the bottom 11 in a smooth fashion. The teeth are there shown connected to the curved portion but they might be fastened to a flat portion as shown in FIG. 2.

What is claimed is:

1. A digging bucket having a bottom terminating in a leading digging edge, said bucket having two substantially parallel side walls, two rows of saw teeth, one row substantially in line with each of said side walls, said rows of saw teeth extending generally at right angles to said digging edge and protruding outwardly from said bucket bottom sufficiently to cut into excavatable material below said bucket bottom during excavating travel of said bucket, disengageable interengaging key means between each of said rows of teeth and the adjacent bucket side wall including a tongue integral with a row of teeth and generally coplanar therewith and having shoulders generally at right angles to a plane passing through said digging edge, and said key means also including blocks snugly fitting against said shoulders on opposite sides of said tongues, said blocks rigid on the outer faces of said bucket side walls, and detachable fastening means independent of said key means attaching each said row of teeth rigidly to said bucket, whereby said key means takes a major portion of the load due to cutting action of said teeth, and said teeth can be replaced without disturbing said blocks.

2. The combination of claim 1, wherein said key means and fastening means are reversible side for side and end for end, whereby upon saw tooth wear a left-hand row may replace a right-hand row and vice versa.

References Cited

UNITED STATES PATENTS

| | | | |
|---|---|---|---|
| 56,142 | 7/1866 | Emerson | 143—147 |
| 340,792 | 4/1886 | Legg | 299—91 |
| 381,811 | 4/1888 | Peckover | 143—145 XR |
| 740,165 | 9/1903 | Musso. | |
| 1,398,195 | 11/1921 | Liggett | 37—191 |
| 1,673,899 | 6/1928 | Brozeit | 299—88 XR |
| 1,719,576 | 7/1929 | Voit | 37—141 XR |
| 2,652,641 | 9/1953 | Zowaski | 37—189 XR |
| 2,764,306 | 9/1956 | Dorkins. | |
| 3,286,377 | 11/1966 | Long | 37—118 |

FOREIGN PATENTS 65,955   8/1913   Switzerland.

ROBERT E. PULFREY, Primary Examiner

C. D. CROWDER, Assistant Examiner

U.S. Cl. X.R.

37—86, 103, 191; 143—149; 214—145; 299—91